Patented Jan. 17, 1950

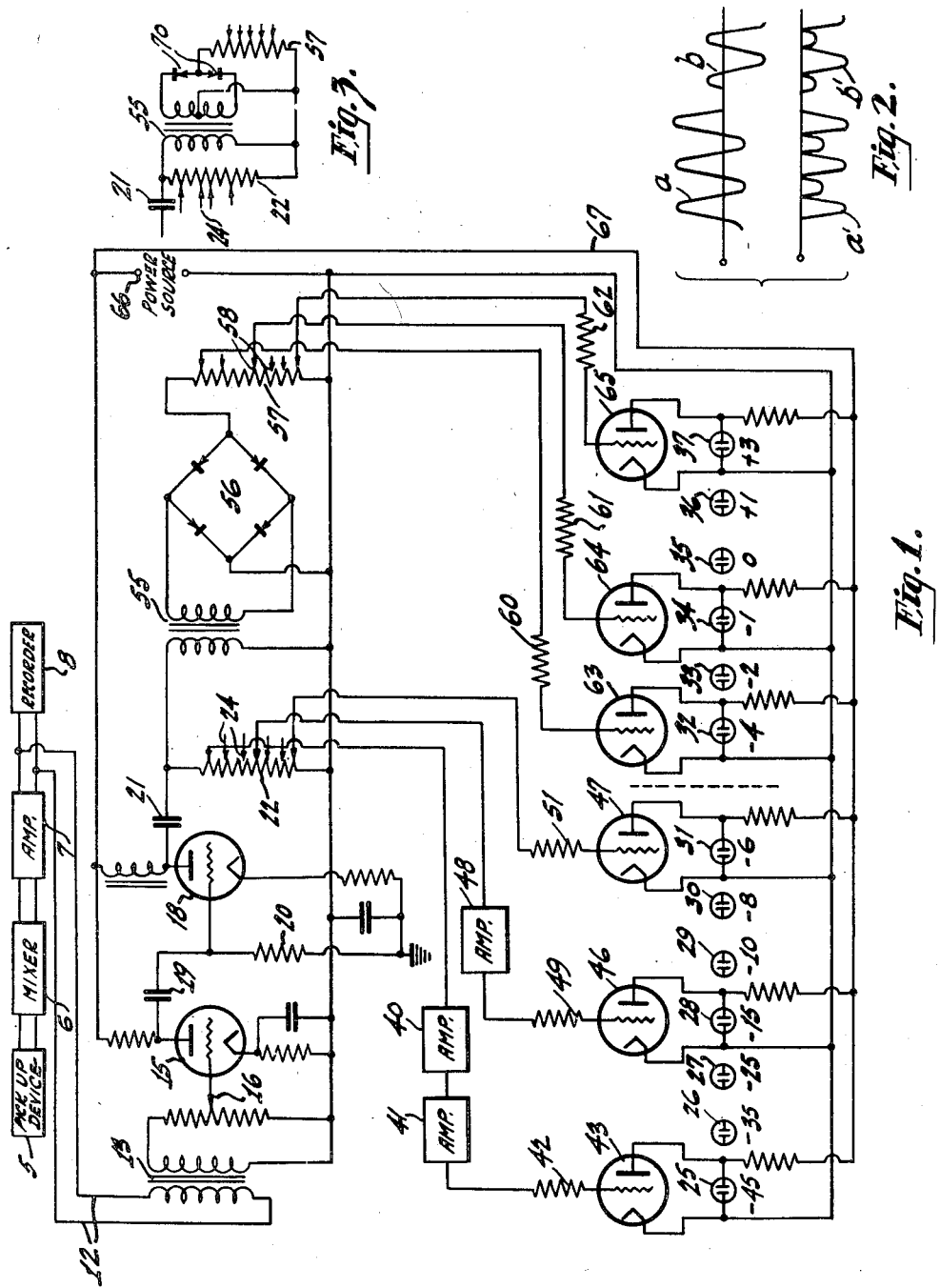

2,494,643

UNITED STATES PATENT OFFICE 2,494,643

VOLUME INDICATOR SYSTEM

John F. Clark, III, Burbank, Calif., assignor to Radio Corporation of America, a corporation of Delaware Application November 21, 1946, Serial No. 711,416

4 Claims. (Cl. 177—311)

This invention relates to electrical level or volume indicators, and particularly to a neon lamp type of voltage, current, or power indicator of the type disclosed and claimed in U. S. Patent No. 2,179,101 of November 7, 1939.

The type of neon lamp volume indicator shown in the above-mentioned patent is well-known, and has been in commercial use, particularly for indicating the level of audio sound currents being recorded on film and wax. These sound currents are primarily generated by the dialogue of actors and singers, background music and sound effects. In many film recording systems for such currents, such as those used in producing sound motion pictures, light modulators of the galvanometer type are employed. These recording systems employ a mixer whose purpose is to vary the volume or level of the audio signal as it is impressed upon the modulating element, the mixer being guided by the volume indicator.

It has been found that the alternating currents, particularly the dialogue and vocal signal currents being impressed upon the galvanometer are asymmetrical sound waves, with the peaks on one side of the zero axis being considerably higher than the peaks on the other side of the axis. This variation in peak amplitude may be in the neighborhood of three db or more. Furthermore, it has been found that the highest peaks are not of constant polarity, but may shift from one side of the wave to the other.

A volume indicator of the neon lamp type disclosed in the above-identified patent operates from a polarized signal current, and, thus, always indicates the level of the peaks on a certain side of the zero axis. With the sound waves being asymmetrical, the level indicated may not be that of the higher peaks, thus giving an erroneous reading with respect to the level impressed on the galvanometer. At low audio levels, this differential is not detrimental as the indicator is calibrated in widely separated steps compared with the calibration at the higher levels, but when the sound level approaches one hundred percent modulation of the galvanometer or one hundred percent of the track width, there is considerable danger of over-loading the modulating element or of over-shooting the track area if the volume indicator does not accurately indicate the maximum peaks at these levels.

The present invention is directed to a volume indicator which functions in the same manner as that indicated in the above-mentioned patent in the lower volume range, but in the upper volume range, it is designed to function at the highest input peaks regardless of whether they are positive or negative. This is accomplished by utilizing a full-wave rectifier from which the neon tubes indicating the higher levels are fed. In this manner, both sets of peaks are shifted to one polarized side of the indicator and thus, regardless of the polarity of the incoming signal, the maximum level of the peaks will always be indicated.

The principal object of the invention, therefore, is to facilitate the accurate indication of a signal level.

Another object of the invention is to provide an improved volume indicator which will follow the highest peaks regardless of the polarity of the impressed waves.

A further object of the invention is to provide an improved neon tube volume indicator which will accurately read peak levels over the upper portion of the volume range.

A still further object of the invention is to provide a volume indicator circuit which shifts all the peaks to one side of the zero axis for the purpose of indicating the level thereof.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a combination diagrammatic and schematic circuit of an indicator system embodying the invention.

Fig. 2 is a graph illustrating the manner of shifting the waves to a single polarity, and Fig. 3 is a modification of a portion of the circuit of Fig. 1.

Referring now to the drawings, a film recording system is illustrated diagrammatically as comprising a pickup device 5 which may be a microphone or other signal source to be recorded. The pickup device is connected to a mixer 6 and then to an amplifier 7 which is connected to a recorder of any commercial type. Bridged between the amplifier 7 and recorder 8 is the input to a volume indicator, the output of the amplifier being connected by conductors 12 to an input transformer 13. The signal is first amplified in an amplifier 15, the input of which may be varied by potentiometer 16. The tube 15 is coupled to a second amplifier 18 over a condenser 19 and resistor 20, the output of the tube 18 being impressed across a potential divider 22. The various sliders 24 on the divider 22 are connected to the lower calibrated group of neon tubes 25 to 31, inclusive, tube 25 being connected over two amplifiers 40 and 41, a series resistor 42, and an amplifier 43. For the purpose of simplification, only neon tubes 25, 28, and 31 are shown connected to the divider, tube 28 being connected over an amplifier 48, a resistor 49, and vacuum tube 46, while neon tube 31 is connected over a resistor 51 and a tube 47.

The other neon tubes 26, 27, 29, and 30 are similarly connected over one or more amplifiers in the same manner as shown in the above-mentioned patent. The amplifiers 40, 41, and 48 are used in the circuits of the neon tubes indicating low levels, inasmuch as it becomes necessary to amplify the currents at these levels to provide sufficient voltage to light the neon tubes. At the higher levels, it is unnecessary to use additional amplifiers. As disclosed in the above-mentioned patent, the neon tubes will be energized in serial order with increasing voltage across the divider. It will be noted from the volume levels marked under the neon tubes that there is considerable width between the low level steps so that any differences in peaks are not important.

Bridged across the voltage divider 22 is an isolating transformer 55 connected to a full-wave bridge rectifier circuit 56, which rectifiers may be of the copper oxide type. Bridged across the output of rectifier 56 is a voltage divider 57 having a plurality of adjustable sliders 58. The sliders 58 are connected to the group of neon lamps from 32 to 37, inclusive, only three circuits being shown for clarity, these circuits including resistors 60, 61, and 62, and amplifier tubes 63, 64, and 65. The anodes of all the tubes are supplied from a common power source 66 over conductor 67. With respect to the tubes 32 to 37, it is to be noted that from tubes 33 to 36, inclusive, the width of the steps is only one db since this covers the critical recording range.

Referring now to Fig. 2, an asymmetrical signal reaching the input transformer 13 is illustrated, signal a showing higher positive peaks than negative peaks, and signal b showing higher negative peaks than positive peaks. After passing through the rectifier 26, however, signal a is shown at a' and signal b at b', the signals a' and b' being the signal impressed upon the neon tubes 32 to 37, inclusive. Thus, regardless of the variation in level between the positive and negative cycles, the level of the higher peaks will register on the indicator, since it is poled in this direction. In this manner, when one hundred percent modulation or full track recording is approached, the volume indicator gives an accurate reading of the high peaks regardless of the polarity of the signal reaching the input of the indicator.

Referring now to Fig. 3, a modification of the full-wave rectifier shown in Fig. 1 is illustrated wherein the transformer 55 has a center tapped secondary across which two rectifiers, such as 6H6 vacuum tubes 70, are employed, the divider resistor 57 being connected between the rectifiers and the center tap. The neon tubes 25 to 37, inclusive, may be of the RCA 991 type. It has been found that by impressing on the upper level neon tubes a full-wave rectified signal that a particularly accurate volume indicator is provided which permits precise observation of the peak signal level over the critical volume range where such information is of prime importance.

I claim:

1. A volume indicator having a varying sensitivity over a predetermined level range to be indicated comprising an input circuit, a voltage divider connected in said input circuit, a plurality of sliders associated with said divider, a plurality of neon tubes connected to said sliders and adapted to be energized according to the level of an alternating current signal at said divider, said signal being directly impressed on said tubes after a predetermined amplification, a full-wave rectifier connected across said divider, a second divider in the output of said rectifier, a second plurality of neon tubes connected across different portions of said second divider, said second plurality of tubes having direct current impressed thereon in accordance with the highest level values of said signal, and an isolating element connected between said full-wave rectifier and said first mentioned voltage divider.

2. A volume indicator in accordance with claim 1, in which said isolating element is a transformer.

3. A volume indicator comprising a plurality of neon tubes adapted to be energized in a serial order with increasing voltages of an alternating current signal, means for impressing said alternating current signal on a predetermined number of said tubes to indicate a wide low range of voltages, means for rectifying both positive and negative peaks of said alternating current signal, means for impressing the output from said rectifying means on the remaining neon tubes to indicate a narrow upper range of voltages of said signal, and an isolating element between said rectifying means and said alternating current impressing means.

4. A volume indicator in accordance with claim 3, in which said first mentioned means includes a potentiometer, said first mentioned predetermined number of tubes being connected across widely spaced portions of said potentiometer, said last mentioned means includes a second potentiometer, said remaining neon tubes being connected across normally spaced portions of said second potentiometer, and said isolating means is a transformer connected between said first mentioned potentiometer and said rectifying means.

JOHN F. CLARK, III.

REFERENCES CITED

The following references are of record in the file of this patent:

UNITED STATES PATENTS

| Number | Name | Date |
| --- | --- | --- |
| 1,744,840 | Strieby | Jan. 28, 1930 |
| 1,817,765 | Rex | Aug. 4, 1931 |
| 1,823,739 | Horton | Sept. 15, 1931 |
| 2,179,101 | Read | Nov. 7, 1939 |